United States Patent [19]
Evans

[11] 3,991,348
[45] Nov. 9, 1976

[54] APPARATUS FOR CONTROLLING ACCESS TO HIGH VOLTAGE METAL-ENCLOSED SWITCHGEAR

[75] Inventor: David M. Evans, Palatine, Ill.
[73] Assignee: S & C Electric Company, Chicago, Ill.
[22] Filed: Apr. 1, 1975
[21] Appl. No.: 564,175

[52] U.S. Cl. .............................. 317/114; 317/103; 200/50 AA
[51] Int. Cl.² ........................................ H02B 9/00
[58] Field of Search ................. 337/211, 212, 6, 7, 337/245; 317/103, 114, 116, 120; 174/51, 52 R; 200/50 AA; 81/3.8

[56] References Cited
UNITED STATES PATENTS

| | | | |
|---|---|---|---|
| 3,283,215 | 11/1966 | Lohmeyer | 317/114 |
| 3,339,118 | 8/1967 | Harner | 317/114 |
| 3,727,109 | 4/1973 | Kozlovic | 317/103 |
| 3,842,381 | 10/1974 | Bernatt | 337/7 |

Primary Examiner—Gerald P. Tolin
Attorney, Agent, or Firm—Kirkland & Ellis

[57] ABSTRACT

Disclosed is an apparatus for restricting access to the electrically charged portions within metal enclosed high voltage switchgear. The apparatus is adapted for use with a tool that can be inserted into the enclosure to open a tap switch and remove a series connected high voltage fuse. Normally, access ports into the metal enclosure are closed by pivotably mounted covers to restrict access. Insertion of the tool into a receptacle around the access port opens the covers so that a portion of the tool can be inserted into the enclosure to open the tap switch thereby isolating the fuse and to engage the fuse so that it can be removed. The tool engages a ring member mounted around the access port so that operation of the tool moves the ring member. Operably connected to the ring member is an indicator member that moves in response to movement of the ring member to align an appropriate message in front of a window in the enclosure so that the condition of the switchgear is indicated. Also, the metal portions of the tool are grounded to prevent possible electrical shock to the tool operator.

10 Claims, 8 Drawing Figures

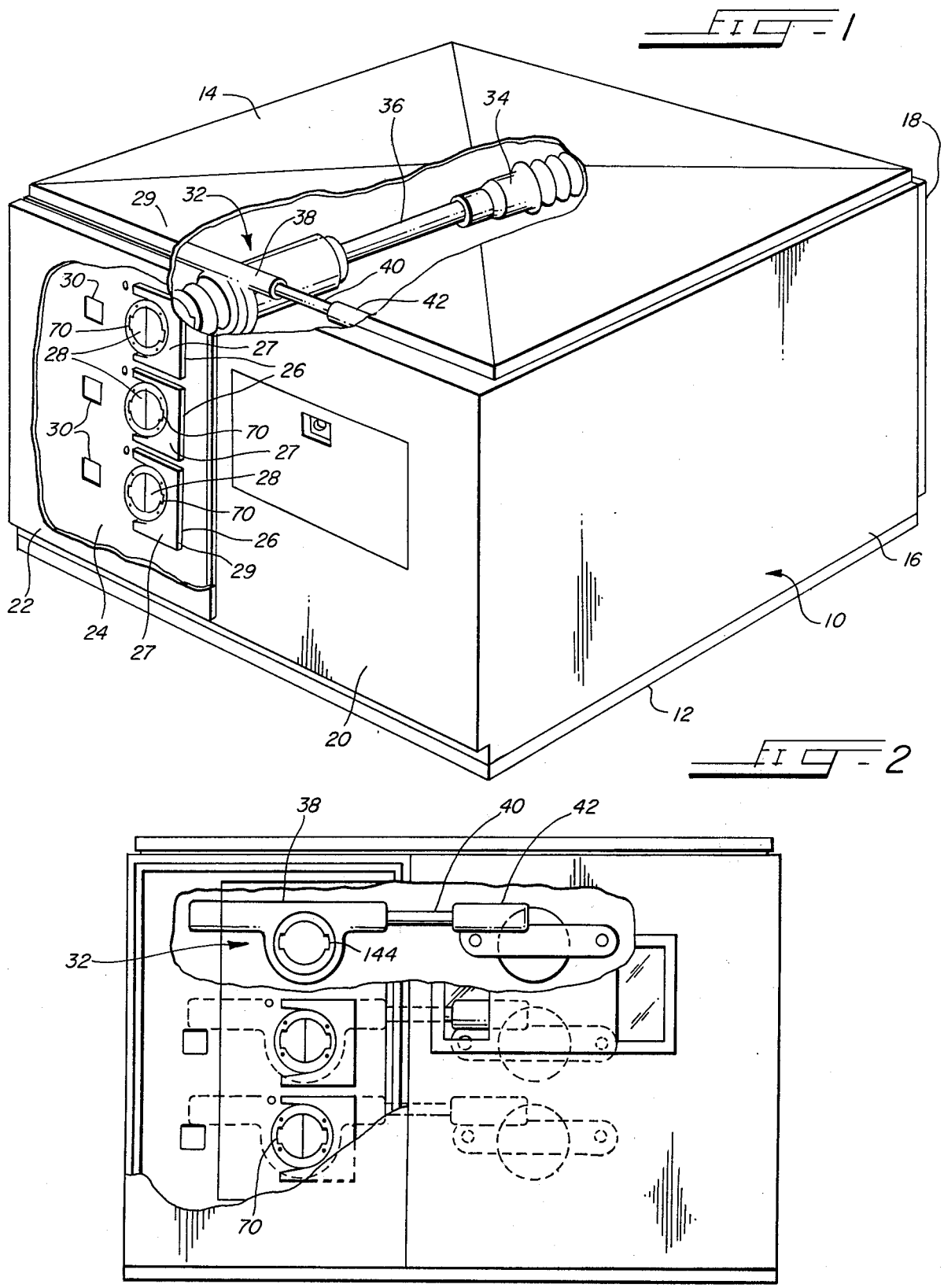

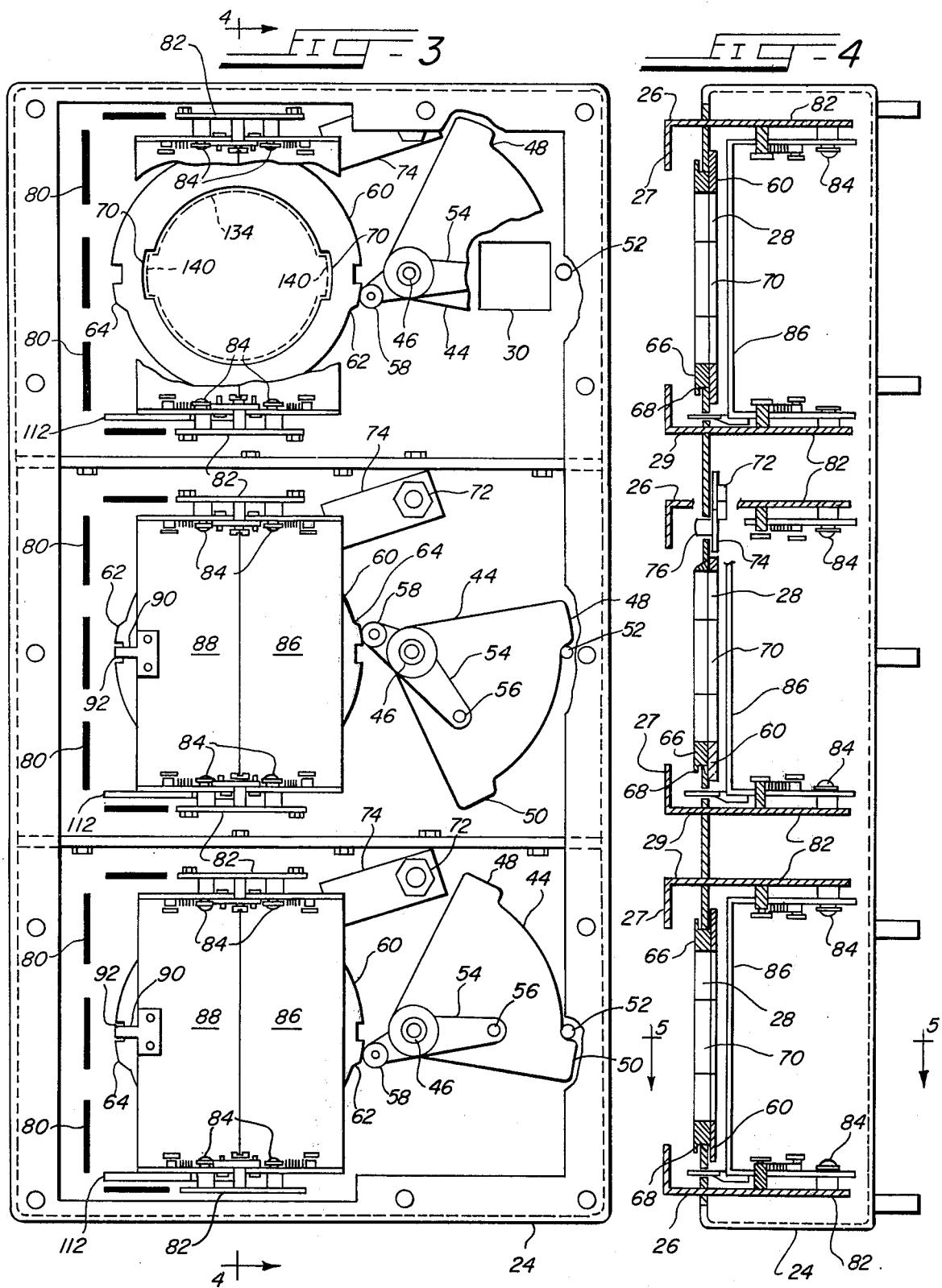

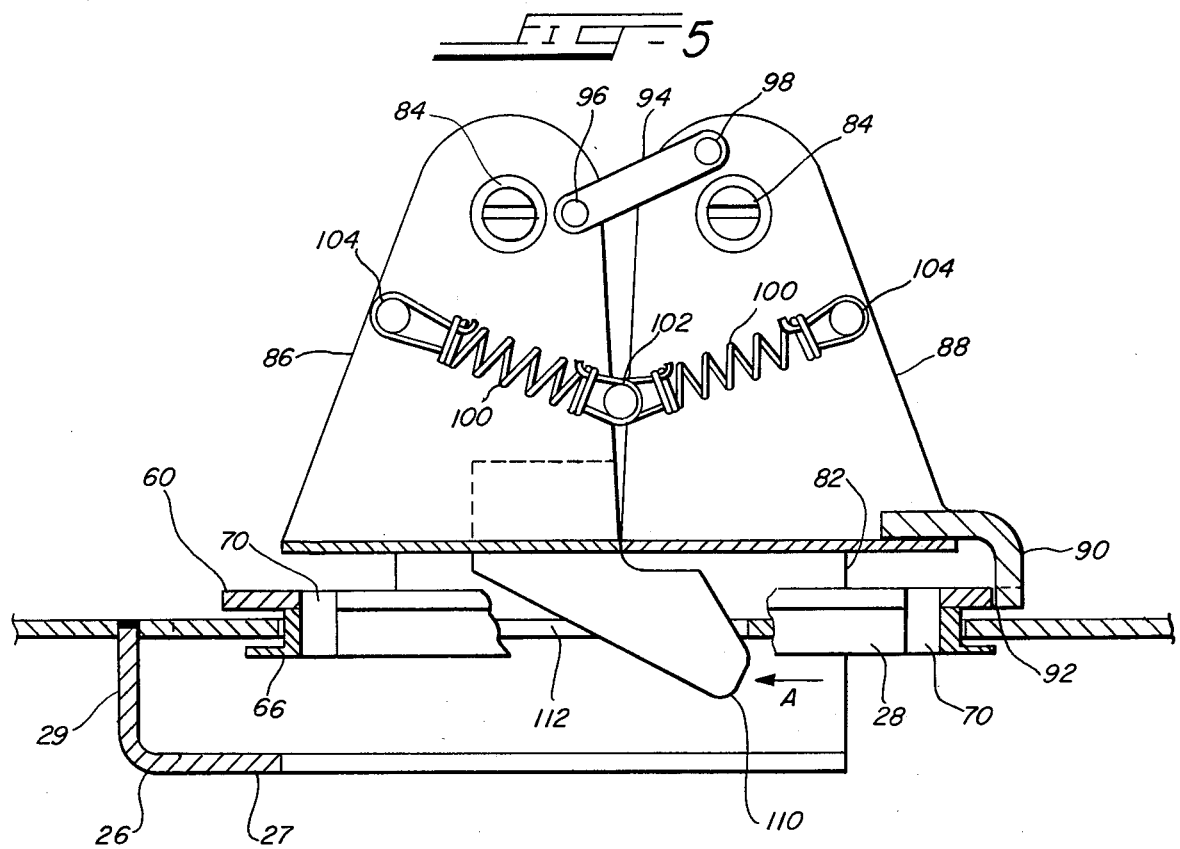
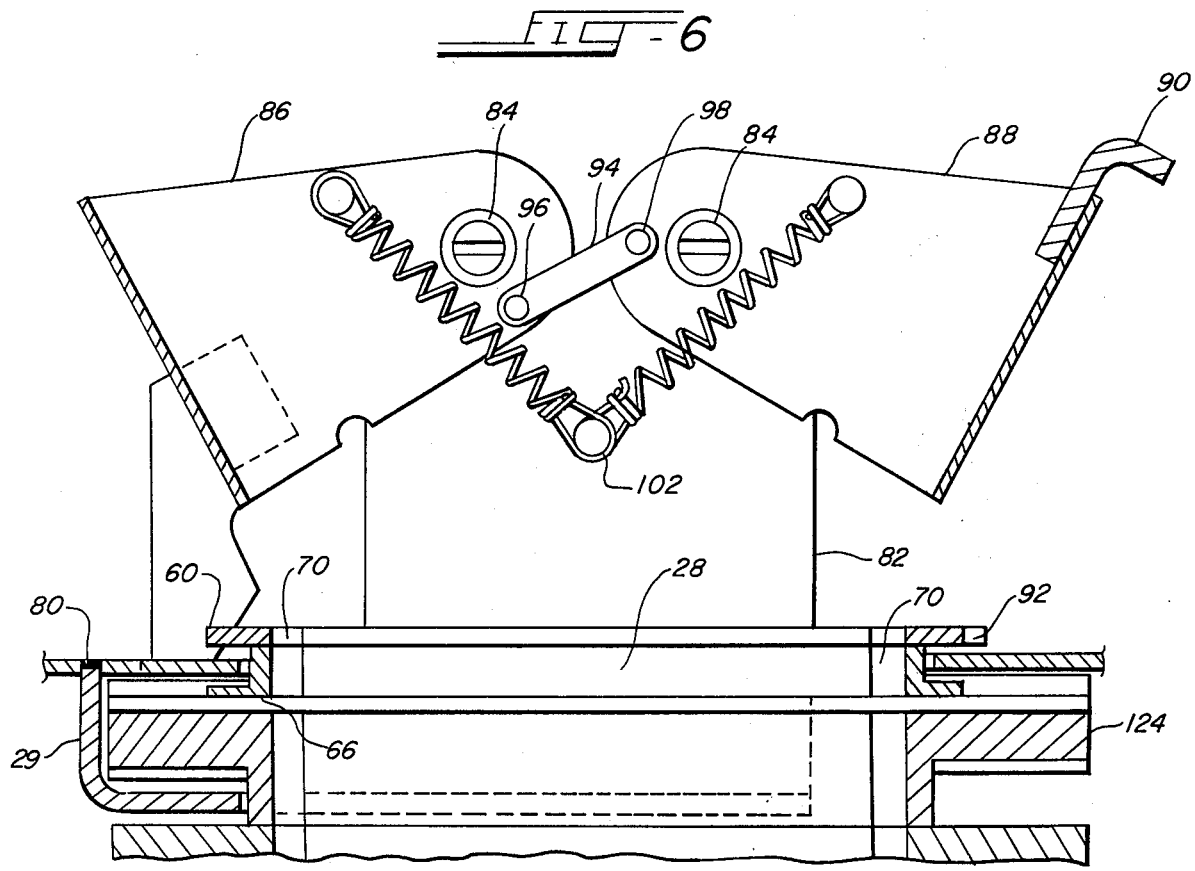

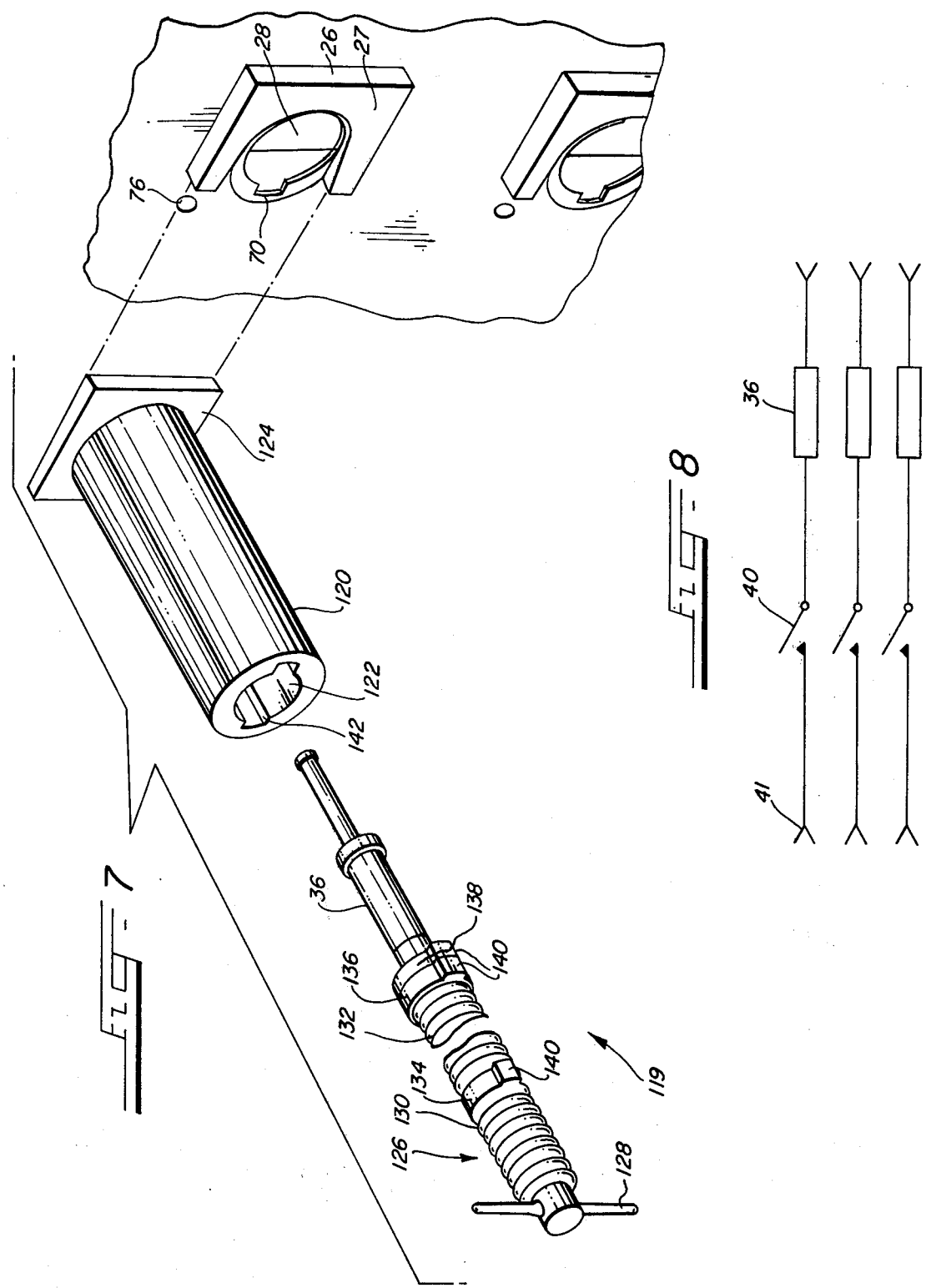

APPARATUS FOR CONTROLLING ACCESS TO HIGH VOLTAGE METAL-ENCLOSED SWITCHGEAR

BACKGROUND OF THE INVENTION

1. Field of the Invention

The present invention relates to apparatus for restricting access to the electrically charged components within metal-enclosed switchgear, and more particularly, the present invention relates to apparatus for restricting access to metal-enclosed switchgear until a tool for opening a switch to isolate a high voltage fuse and remove the fuse is properly positioned.

2. Description of the Prior Art

The present invention constitutes an improvement over the structure disclosed in U.S. Pat. No. 3,842,381 — Bernatt et al. entitled "INTEGRAL FUSE AND SWITCH SUPPORT FOR METAL-ENCLOSED SWITCHGEAR", issued Oct. 15, 1974, and assigned to the same assignee as the present invention. That patent illustrates one type of prior art metal-enclosed loop switchgear. Metal-enclosed pad-mounted switchgear for distribution of electric power is employed for switching load circuits and for interrupting and isolating faults. The overall size of the enclosure is important since the size must be consistent with proper spacing between energized elements and between energized elements and ground. A compact construction efficiently utilizing the space within the metal enclosure is of paramount importance.

Further, since it is desirable to selectively isolate a fuse from its respective supply circuit so that the fuse can be tested and/or replaced without opening the loop circuit, it is desirable to provide isolator switches between the supply circuit and the fuse to interrupt current flow to the electrical load. Since the distance between the components within metal-enclosed switchgear is quite limited, accidental contact with the charged portions of the circuitry is possible unless safeguards are provided. Accordingly, it is desirable to provide a means for removing the fuses from the metal enclosure which permits the seviceman to do so without coming into contact with or into proximity to the electrically charged components of the switchgear.

In addition, since vandals and curious children sometimes break into and open the covering doors of metal-enclosed switchgear, it is desirable to restrict access to the electrically charged components of the switchgear to prevent accidental shock.

BRIEF DESCRIPTION OF THE INVENTION

An apparatus for restricting access to the electrically charged portions within a grounded metal enclosure enclosing at least one high voltage fuse and series connected isolator switch in accordance with the present invention comprises a grounded front panel mounted on the enclosure having at least one circular opening therethrough for gaining access to the fuse within the enclosure. The front panel also has at least one window formed therethrough adjacent the circular opening. The apparatus is adapted for use in conjunction with a tool for operating to open the isolator switch and engaging the fuse so that the fuse can be removed from the enclosure. A receptacle is mounted on the housing around the circular opening, and the receptacle is formed to receive and retain the tool. Mounted for movement in the circular opening is a ring means having an access port formed therethrough for admitting a portion of the tool means. The ring means also includes means for engaging the tool so that operation of the tool will move the ring means. Cover means are provided for normally closing the access port. The cover means is mounted for movement so that when the tool is received by the receptacle, the cover means will move to open the access port so that a portion of the tool can be inserted into the enclosure. Also provided is contact means mounted on the enclosure for electrically engaging the tool received by the receptacle and electrically connecting the grounded enclosure to the portion of the tool remaining outside the enclosure. In addition, indicating means are provided having affixed thereto one or more printed messages indicating the condition of the fuse and isolator switch within the enclosure. The indicating means is operably connected to the ring means so that movement of the ring means by the tool will move the indicating means to align an appropriate message in front of the window.

Also mounted on the cover means is stop means for engaging the ring means to prevent movement of the ring means when the cover means is closed so that the message displayed by the indicating means cannot be accidentally changed by movement of the ring means.

Thus, it is a primary object of the present invention to provide an apparatus for restricting access to the electrically charged portions of metal-enclosed switchgear until a suitably grounded tool is inserted into a receptacle on the front of the metal enclosure.

It is a further object of the present invention to provide a means of indicating the condition of the components within the metal enclosure that is operated simultaneously with the operation of a tool which can be utilized to operate an isolator switch and remove a fuse from the enclosure.

It is yet a further object of the present invention to provide means of locking the indicating means to prevent accidental change of the message displayed by the indicating means.

These and other objects, advantages and features of the present invention will hereinafter appear, and for the purposes of illustration, but not of limitation, an exemplary embodiment of the present invention is illustrated in the accompanying drawings.

DESCRIPTION OF THE DRAWINGS

FIG. 1 is an upper right front partially fragmentary perspective view of metal-enclosed switchgear having a preferred embodiment of the present invention mounted thereon.

FIG. 2 is a front partially fragmentary view of the switchgear and preferred embodiment illustrated in FIG. 1.

FIG. 3 is a back partially fragmentary view of the front panel of the preferred embodiment of the present invention.

FIG. 4 is a cross sectional partially fragmentary view taken substantially along line 4—4 in FIG. 3.

FIG. 5 is a cross sectional partially fragmentary view taken substantially along line 5—5 in FIG. 4.

FIG. 6 illustrates the structure shown in FIG. 5 showing the cover members in an open position when a tool is positioned in the receptacle.

FIG. 7 is an exploded partially fragmentary perspective view of the front panel of the present invention and a fuse removing tool.

FIG. 8 is a simplified schematic wiring diagram of the electrical components of the metal-enclosure switchgear.

DETAILED DESCRIPTION OF THE PREFERRED EMBODIMENT

With reference to FIGS. 1 and 2, a metal enclosure 10 is mounted on a concrete slab 12 and comprises top cover 14, side walls 16, back wall 18, front wall 20 and front door 22. Front door 22 is hinge mounted so that it may be opened to expose front panel 24. Front door 22 is shown in its closed position with a portion removed to show front panel 24. Mounted on front panel 24 are three tool receiving receptacles 26 mounted to one side of access ports 28. Tool receiving receptacles 26 are open at one side and include three wall members 29 mounted essentially perpendicular to front panel 24 and a flange member 27 parallel to front panel 24 dimensioned to receive and retain a tool as will be explained further below. Formed through front panel to one side of access ports 28 are windows 30.

Positioned inside metal enclosure 10 is front fuse contact assembly 32 and back fuse contact assembly 34. Connected between and electrically engaging both front fuse contact assembly 32 and back fuse contact assembly 34 is fuse 36. Front fuse contact assembly 32 comprises tap switch operating mechanism 38 and tap switch blade 40. Tap switch blade 40 engages stationary contact 42. Tap switch blade 40 is adapted to be moved linearly away from stationary contact 42 to break electrical engagement and disconnect fuse 36 from the electrical circuit as will be described below.

With reference to FIG. 8, a simplified schematic diagram is illustrated. Fuse 36 is serially connected with tap switch blade 40 so that when tap switch blade 40 is opened, the electrical circuit between the supply terminals 41 and fuse 36 is interrupted. Thus, with tap switch blade 40 open, no electrical current is supplied to fuse 36.

With reference to FIG. 3, a back view of front panel 24 is illustrated. Positioned over windows 30 are indicator members 44 that are pivotably mounted on shafts 46. Indicator members 44 have stop tabs 48 and 50 that engage stop pins 52 to limit the angular movement of indicator members 44. FIG. 3 illustrates the two possible positions of indicator members 44. Also mounted on shafts 46 are lever arms 54 which are connected to indicator members 44 at one end by pins 56. Attached to the other end of lever arms 54 are cam follower rollers 58 which engage the edges of ring plates 60. Ring plates 60 have formed on the edges thereof cam surfaces 62 and 64 which engage cam follower rollers 58 to pivot indicator members 44 to the appropriate position to align a message in front of window 30 to indicate the condition of the tap switch and fuse as will be explained below.

With reference to FIG. 4, each ring plate 60 is positioned against the interior surface of front panel 24. Attached to each ring plate 60 and extending through circular openings in front panel 24 are ring plates 66. Each of ring plates 66 has a flange 68 formed around the periphery thereof which is of greater diameter than the circular opening through front panel 24 so that ring plate 60 and ring plate 66 will rotate within the circular opening in front panel 24 but cannot be removed without disengaging ring plate 60 and ring plate 66. Formed through ring plate 60 and ring plate 66 is access port 28 previously described. Formed on opposite edges of access port 28 are indentations 70 (see FIGS. 1 and 3) which receive engaging tabs on a fuse removing tool as will be described further below.

Also mounted to the interior of front panel 24 by bolt 72 is grounding member 74. Grounding member 74 has a grounding contact 76 that extends through a small circular opening in the front of front panel 24 (see cut away section of FIG. 4). Grounding contact 76 engages the fuse removing tool when it is inserted into tool receiving receptacle 26 so that the tool is electrically connected to metal enclosure 10 which is grounded.

Tool receiving receptacles 26 have tabs which extend into slots 80 in front panel 24 and are welded to front panel 24 (see FIGS. 3, 5, and 6). Tool receiving receptacles 26 also have cover supporting flanges 82 which extend through front panel 24. Pivotably mounted on cover supporting flanges 82 by screws 84 are first cover members 86 and second cover members 88.

With reference to FIG. 5, first and second cover members 86 and 88 are shown in their closed position closing access port 28. Mounted on second cover member 88 is L-shaped tab 90 that engages an indentation 92 formed on the edge of ring plate 60 so that ring plate 60 and ring plate 66 cannot be rotated as long as first and second cover members 86 and 88 are in the closed position as shown in FIG. 5.

A linkage member 94 is pivotably connected at one end to first cover member 86 by pin 96 and at its other end to second cover member 88 by pin 98. Springs 100 are connected between a shaft 102 mounted on cover supporting flanges 82 and pins 104 on first and second cover members 86 and 88 respectively so that first and second cover members 86 and 88 are biased towards the closed position as illustrated in FIG. 5.

Mounted on first cover member 86 is opening tab 110 which extends through a slot 112 in the front of front panel 24. When force is exerted on the end of opening tab 110 in the direction of arrow A in FIG. 5, first cover member 86 will pivot around screw 84 in a clockwise direction causing cover member 86 to pivot away from access port 28. Because of the linkage member 94 interconnecting first cover member 86 and second cover member 88, when first cover member 86 is pivoted in a clockwise direction, second cover member 88 will pivot in a counterclockwise direction thereby also pivoting away from access port 28. Also, as second cover member 88 pivots, tab 90 disengages indentation 92 so that ring plates 60 and 66 can rotate.

With reference to FIG. 7, one type of tool in connection with which the subject invention can be used is illustrated. The tool 119 comprises a metallic housing 120 having a hollow interior 122 extending completely through metallic housing 120. Mounted at one end of metallic housing 120 is rectangular flange 124 which is dimensioned to slide into tool receiving receptacle 26 so that the hollow interior 122 aligns with access port 28. The tool 119 also comprises operating portion 126 including handle 128, insulators 130 and 132, and metal rings 134, 136 and 138. Formed on metal rings 134, 136, and 138 are tabs 140 which extend from both sides of metal rings 134, 136, and 138. Any number of tools may be utilized with the present invention and the tool 119 illustrated herein is merely shown for the purposes of illustration. Tool 119 is the subject matter of a separate co-pending application assigned to the same assignee as the present invention. Tool 119 or any other suitable tool could be used. Further, a complete detailed description of tool 119 is not necessary for an understanding of the present invention which relates to an apparatus for restricting access to the metal enclosure 10.

When metallic housing 120 or any similar housing is inserted into tool receiving receptacle 26, flange 124 engages opening tab 110 on first cover member 86 (see FIGS. 5 and 6) causing first and second cover members 86 and 88 to pivot to the position illustrated in FIG. 6. In this position, access port 28 is opened so that operating portion 126 or portions of any other appropriate tool can be inserted into metal housing 10. When operating portion 126 is inserted into the hollow interior 122 of metallic housing 120, tabs 140 slide through grooves 142 on the interior surface of hollow interior 122. These grooves 142 align with indentations 70 in ring plate 60 and 66 and also with groove 144 formed in the hollow interior of front fuse contact assembly 32 (see FIG. 2). When operating portion 126 is fully inserted, the tabs 140 on metal ring 134 engage the indentations 70 in ring plates 60 and 66 (see dotted lines in FIG. 3) so that when operating portion 126 is rotated, these tabs 140 on metal ring 134 cause ring plates 60 and 66 to rotate with operating portion 126. Tabs 140 on metal ring 138 engage a stationary indentation (not shown) within front fuse contact assembly 32 so that rotation of operating portion 126 through an arc of 180° causes the end of operating portion 126 to grip the end of fuse 36 so that fuse 36 can be extracted. The exact mechanism for engaging fuse 36 does not form a part of the present invention and is the subject matter of a separate co-pending application assigned to the same assignee as the present invention. Tabs 140 on metal ring 136 engage indentations (not shown) in tap switch operating mechanism 38 so that rotation of operating portion 126 causes tap switch blade 40 to disengage stationary contact 42 thereby electrically disconnecting fuse 36 from the supply circuit. Operating mechanism 38 does not form part of the present invention and is the subject matter of a separate co-pending application assigned to the same assignee as the present invention.

Thus, rotation of operating portion 126 serves three functions. First, rotation of operating portion 126 rotates ring plates 60 and 66 causing indicator members 44 to pivot from one position to the other position. Second, rotation of operating portion 126 causes tap switch blade 40 to open isolating fuse 36. Third, rotation of operating portion 126 causes tool 126 to grip fuse 36 so that it can be removed.

With reference to FIG. 3, rotation of ring plates 60 and 66 causes cam surfaces 62 and 64 to engage follower roller 58 so that indicator members 44 are pivoted between the two positions shown in FIG. 3 thereby aligning an appropriate message in front of window 30. Indicator means 44 typically would have two messages printed thereon which will align with window 30. One message could be "tap switch closed-fuse installed" and the other message could be "tap switch open-fuse removed". Thus, initially when the fuse is in the circuit and the tap switch is closed, cam 62 engages roller 58 pivotting indicator member upwardly to the position shown by the lower indicator member 44 in FIG. 3 so that the first message would be aligned in front of window 30. However, when operating portion 126 is inserted and rotated so that the tap switch is opened and the fuse is engaged so that it can be removed, the ring plates 60 and 66 are rotated until cam surface 64 engages roller 58 thereby pivoting indicator member 44 downwardly to the position shown by the middle indicator member 44 in FIG. 3 so that the other message, "tap switch open-fuse removed" is positioned in front of the window.

The fuse can then be extracted by operating portion 126 and examined and/or replaced if necessary. If housing 120 is removed from tool receiving receptacle 26, first and second cover members 86 and 88 will pivot back to their closed position (as illustrated in FIG. 5) and L-shaped tab 90 will engage indentation 92 on ring plate 60 so that ring plates 60 and 66 cannot be accidentally rotated by hand to change the message displayed in window 30.

It should also be remembered that when metallic housing 120 is inserted into tool receiving receptacle 126, grounding contact 76 engages metallic housing 120 thereby grounding metallic housing 120 to assure that the tool operator cannot accidentally contact electrically charged portions of the circuit. Further, metallic housing 120 may be made long enough so that it is impossible for the tool operator to insert his arm into the hollow interior 122 far enough to engage electrically charged portions on the inside of metal housing 10.

To re-insert fuse 36 into the circuit, fuse 36 is attached to the end of operating portion 126 and housing 120 is inserted into tool receiving receptacle 126 thereby opening first and second cover members 86 and 88 as previously described. Operating portion 126 can then be inserted through housing 120 and into front contact assembly 32 until the end of fuse 36 engages back fuse contact assembly 34. At this time, operating portion 126 is rotated 180° in the opposite direction thereby disengaging operating portion 126 from fuse 36, closing tap switch blade 40 into stationary contact 42, and rotating ring plates 60 and 66. The rotation of ring plates 60 and 66 causes indicator member 44 to pivot back to its original position so that the message "tap switch closed-fuse installed" is positioned in front of window 30. Operating portion 126 is then removed, and housing 120 is removed from tool receiving receptacle 26 closing first and second cover members 86 and 88 across access port 28 thereby restricting access to the charged electrical portions on the inside of metal enclosure 10.

It should be expressly understood that various changes or modifications of the embodiment described herein may be made without departing from the spirit and scope of the present invention as defined in the accompanying claims. Moreover, any number of tools capable of being received within tool receiving receptacle 26 and inserted through access port 28 into metal enclosure 10 to open tap switch blade 40 and remove fuse 36 may be used.

The present invention involves a means of restricting access to the charged electrical portions inside metal enclosure 10 and a means of indicating the condition of the electrical components inside metal enclosure 10. Thus, until a tool is inserted into tool receiving receptacle 26, access ports 28 remain closed thereby preventing accidental contact with the charged electrical portions on the inside of enclosure 10. This is advantageous not only to prevent accidental contact by a lineman or other utility worker but also minimizes the probability that vandals or other unauthorized personnel who open door 22 will blunder into accidental contact with the electrically charged components of the switchgear.

Further, it should be expressly understood that the present invention is not restricted to any particular fuse contact assemblies or tap switch operating mechanisms. A variety of structures could be utilized in conjunction with the present invention without restricting the advantageous features of the present invention in restricting access to the charged electrical portions within metal enclosure 10.

I claim:

1. In high voltage metal-enclosed switchgear, the switchgear including a grounded metal enclosure enclosing at least one high voltage fuse mounting for mounting a fuse, and at least one series connected isolator switch, an improved apparatus for restricting access to the electrically charged portions within the enclosure comprising:
   a tool for operating to open the isolator switch and inserting or withdrawing the fuse from the enclosure;
   a front panel mounted on the enclosure having at least one circular opening therethrough for gaining access to the fuse within the enclosure, said front panel having at least one window formed therethrough adjacent said circular opening;
   attachment means mounted on said front panel adjacent said circular opening, said attachment means formed to receive and retain the tool;
   ring means mounted for movement in said circular opening having an access port formed therethrough for admitting a portion of said tool, said ring means including means for engaging said tool so that operation of said tool will move said ring means;
   cover means mounted on said front panel for normally closing said access port, said cover means movably mounted so that when said tool is received by said attachment means and positioned over said access port, said cover means will move to open said access port so that an insulated portion of said tool can be inserted into the enclosure;
   contact means mounted on said front panel for engaging said tool received by said attachment means and electrically connecting the portion of said tool remaining outside said front panel to the grounded enclosure;
   indicating means mounted inside said front panel having affixed thereto one or more indicia indicating the condition of the isolator switch and position of the fuse, said indicating means operably connected to said ring means so that movement of said ring means by said tool will move said indicating means to align the appropriate indicia in front of said window.

2. An improved apparatus, as claimed in claim 1, wherein said attachment means comprises three wall members mounted essentially perpendicular to said front panel at one edge thereof around said circular opening and a flange member mounted to the opposite edges of said wall members, said wall members and flange member dimensioned to receive and retain said tool.

3. An improved apparatus, as claimed in claim 1, wherein said ring means comprises a first annular plate having an opening formed therethrough positioned on the outside of said front panel around said opening, a second annular plate having an opening formed therethrough positioned on the inside of said front panel around said opening, means for connecting said first and second plates through said opening so that said first and second plates can rotate within said opening in response to operation of the tool, and cam means on said second plate for engaging said indicating means.

4. An improved apparatus, as claimed in claim 1, wherein said cover means comprises:
   a first cover member pivotably mounted for movement from a first position to a second position;
   a second cover member pivotably mounted for movement from a first position to a second position, said first and second cover members closing said access port when in their first position and opening said access port in their second position;
   a lever means connected to said first cover member and extending through an opening in said front panel adjacent said opening for engaging said tool received by said attachment means and moving said first cover member to its second position when said tool is fully received by said attachment means;
   linkage means connected between said first and second cover members for moving said second cover member to its second position in response to movement of said first cover member to its second position.

5. An improved apparatus, as claimed in claim 3, wherein said indicating means comprises:
   an indicating member pivotably mounted to the inside of said front panel adjacent said window for movement from a first position aligning a first message in front of said window to a second position aligning a second message in front of said window;
   follower means for engaging said cam means on said second plate for moving said indicating member from its first position to its second position in response to rotation of said first and second plates.

6. An improved apparatus, as claimed in claim 1, wherein said contact means comprises a contact member mounted on the inside of said front panel and extending through a hole through said front panel adjacent said attachment means so that when said tool is received by said attachment, said contact member makes electrical contact with said tool means.

7. An improved apparatus, as claimed in claim 1, further comprising stop means mounted on said cover means for engaging said ring means to prevent movement of said ring means when said cover means is closed so that the indicating means cannot be moved to change the message aligned in front of the window.

8. In high voltage metal-enclosed switchgear, the switchgear including a grounded metal enclosure enclosing at least one high voltage fuse mounting for mounting a fuse and at least one series connected isolator switch, an improved apparatus for restricting access to electrically charged portions within the enclosure comprising:
   a tool for operating to open the isolator switch and insert or withdraw the fuse from the enclosure;
   a front panel mounted on the enclosure having at least one circular opening therethrough for gaining access to the fuse within the enclosure;
   a receptacle mounted on said front panel around said circular opening formed to receive and retain said tool;
   ring means mounted on said front panel around said circular opening, said ring means movably mounted in said circular opening and having an access port formed therethrough for admitting a portion of said tool, said ring means including means for engaging said tool so that operation of said tool will move said ring means;

cover means mounted on said front panel for normally closing said access port, said cover means movably mounted so that when said tool is received by said receptacle and positioned over said access port, said cover means will move to open said access port so that an insulated portion of said tool can be inserted into the enclosure;

contact means mounted on said front panel for engaging said tool received by said receptacle and electrically connecting the portion of said tool remaining outside said enclosure to the grounded enclosure.

9. An improved apparatus, as claimed in claim 8, wherein said cover means comprises:
- a first cover member pivotably mounted for movement from a first position to a second position;
- a second cover member pivotably mounted for movement fron a first position to a second position, said first and second cover members closing said access port when in their first position and opening said access port in their second position;
- a lever means connected to said first cover member and extending through an opening in said front panel adjacent said opening for engaging said tool received by said receptacle and moving said first cover member to its second position when said tool is fully received in said receptacle;
- linkage means connected between said first and second cover members for moving said second cover member to its second position in response to movement of said first cover member to its second position.

10. In a grounded metal enclosure enclosing one or more movable high voltage components, an improved apparatus for permitting control access to energized components within the enclosure comprising:
- a tool for manipulating the movable high voltage components;
- a panel mounted on the enclosure having at least one opening therethrough for gaining access to a movable component within the encosure;
- attachment means arranged on said panel adjacent said opening formed to receive and retain said tool;
- cover means normally closing said opening, said cover means movably mounted on said panel to uncover said opening when the tool is received by said attachment means and positioned over said opening so that only an insulated portion of the tool can be inserted into the enclosure through said opening;
- contact means mounted on the panel adjacent said attachment means for contacting the tool received by said attachment means to electrically connect the portion of the tool remaining outside the enclosure to the grounded enclosure.

* * * * *